United States Patent [19]

Hall

[11] Patent Number: 5,475,861
[45] Date of Patent: Dec. 12, 1995

[54] METHOD FOR CONTROLLING TRANSMISSION POWER IN A COMMUNICATION SYSTEM

[75] Inventor: Scott M. Hall, Fort Worth, Tex.

[73] Assignee: Motorola, Inc., Schaumburg, Ill.

[21] Appl. No.: 907,072

[22] Filed: Jul. 1, 1992

[51] Int. Cl.$^6$ ..................................................... H04Q 7/30
[52] U.S. Cl. ...................... 455/33.1; 455/50.1; 375/205; 375/346
[58] Field of Search ................................. 455/33.1, 33.4, 455/54.1, 56.1, 50.1, 52.1, 52.3, 115; 379/59, 63; 375/200, 205, 346

[56] References Cited

U.S. PATENT DOCUMENTS

| | | | |
|---|---|---|---|
| 4,435,840 | 3/1984 | Kojima et al. | 455/56.1 X |
| 4,670,899 | 6/1987 | Brody et al. | 455/56.1 X |
| 5,241,685 | 8/1993 | Bodin et al. | 455/54.2 X |
| 5,241,686 | 8/1993 | Charbonnier | 455/54.1 X |
| 5,245,629 | 9/1993 | Hall | 375/1 |

*Primary Examiner*—Edward F. Urban
*Attorney, Agent, or Firm*—Raymond J. Warren

[57] ABSTRACT

The transmit power margin of frame error rate for each subscriber in the system is measured to determine if any "bad" subscribers, those subscribers with transmit power margins of frame error rates that cross a threshold, are in the system. If the system is under capacity, the threshold level is set to the first threshold and the signal-to-noise ratio is incremented. If the system is at marginal capacity, the threshold transmit power margin is set to a second threshold and the system is closed to new calls. If the system is over capacity: the threshold transmit power margin is set to a second threshold; the system is closed to new calls; and the signal-to-noise ratio is decremented.

42 Claims, 6 Drawing Sheets

METHOD FOR CONTROLLING TRANSMISSION POWER IN A COMMUNICATION SYSTEM

RELATED INVENTIONS

The following invention relates to the present application:

A Method for Compensating for Capacity Overload in a Spread Spectrum Communication System, U.S. Ser. No. 07/783,751 filed on Oct. 28, 1991 now U.S. Pat. No. 5,245,629 and assigned to Motorola Inc.

FIELD OF THE INVENTION

The present invention relates, in general, to communication systems and, more particularly, to a method for controlling transmission power in a communication system.

BACKGROUND OF THE INVENTION

In a cellular communication system using spread spectrum technology, such as Code Division Multiple Access (CDMA), the spectrum is divided into 40 frequency bands. The 40 bands are divided between wireline and non-wireline applications, generally assigning 20 bands to each. The 20 bands are equally divided with 10 bands used for forward communication, with the base site as the transmitter, and 10 bands used for reverse communication, with the mobile as the transmitter. Each band is typically 1.2288 MHz wide and will handle multiple users simultaneously.

In this description, calls and users are used interchangeably. A band that supports X users supports X calls. The capacity of a band in number of users refers to full rate (9600 baud) users unless otherwise stated. A band that supports X full rate (9600 baud) users, will support 2X half rate (4800 baud) users, or 4X quarter rate (2400 baud) users. The band will also support a certain number of variable rate users (9600, 4800, 2400, or 1200) with the exact number of users dependent on the amount of time spent at each baud rate.

In operating at system capacity, accurate mobile transmit power control is very important. Mobile power is controlled from the base station by transmitting power control data to the transmitting mobiles. The base station can direct each mobile to increase or decrease its transmitting power, typically in preset increments (e.g. 0.5 dB), through use of a Frame Error Rate (FER) measurement and an $E_b/N_o$ (signal to noise measurement).

While measuring the amount of noise present in the system and adjusting the system accordingly is an important aspect of maintaining good quality communications, it is also important that the entire system not be manipulated to compensate for problems being experienced by individual subscriber units.

Therefore, it is important to not only determine the noise level of a particular system, but to monitor the communication quality of individual subscriber units and determine if system wide adjustments are warranted.

SUMMARY OF THE INVENTION

The present invention provides a method for controlling transmission power in a communication system having a threshold transmit power margin initially set to a first threshold. A signal characteristic, such as power margin or frame error rate, for each subscriber in the system is measured to determine if any "bad" subscribers, those subscribers whose signal characteristic dose not meet a threshold, are in the system.

When enough "bad" subscribers are present, the system will make a system-wide adjustment. Conversely, if the system was previously adjusted, it will be returned to normal operation once the problem is resolved. This process operates based upon the system capacity. If the system is under capacity, the threshold level is set to a first threshold and the signal-to-noise ratio is incremented. If the system is at marginal capacity, the threshold transmit power margin is set to a second threshold and the system may be closed to new calls. If the system is over capacity, the threshold transmit power margin is set to a third threshold; the system is closed to new calls; and the signal-to-noise ratio is decremented.

DETAILED DESCRIPTION OF THE DRAWINGS

Figure 1:
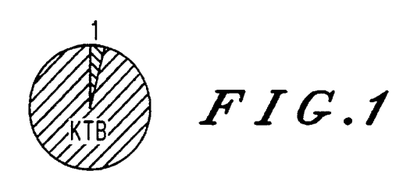
FIGS. 1–3 are abstract representations of power use by user within a communication system.
Figure 2:
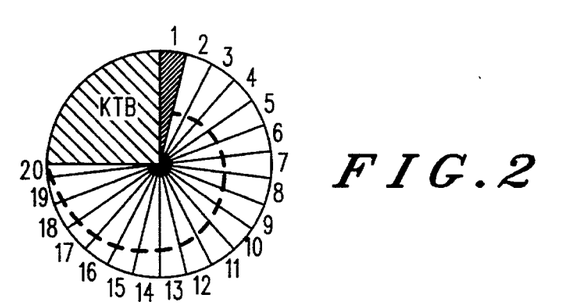
Figure 3:
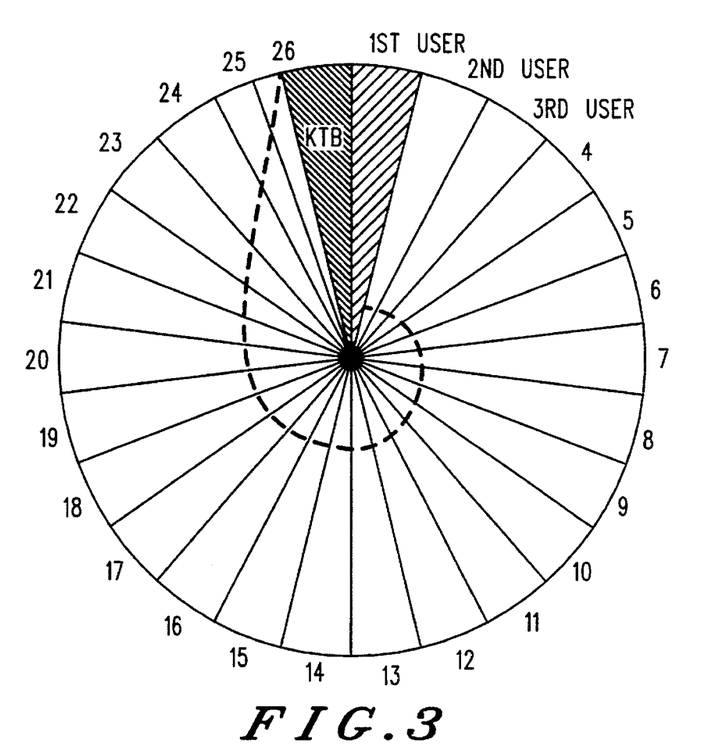

Referring initially to FIGS. 1–3, abstract representations of power usage by user within a communication system is illustrated. Within these figures, the areas represent the power of various signals over the 1.2288 MHz bandwidth. For example, KTB is the power of the thermal noise signal where: K is Boltzmans constant; T is the temperature in degrees absolute (Kelvin); and B is the signal bandwidth in hertz (Hz). The power of the KTB signal is constant in each of FIGS. 1–3. For purposes of this discussion, we will use a KTB of −113 dBm.

When a single user is on the system, FIG. 1, the power of the user's signal must be −127 dBm (14 dBm below KTB) in order to provide an Energy per bit to total Noise ratio ($E_b/N_o$) of 7 dB. The 7 dB number was selected as a ratio which will provide a preferred audio signal quality. This figure will vary for each system depending upon the particular environment of the system and is used herein only for illustrative purposes.

Figure 4:
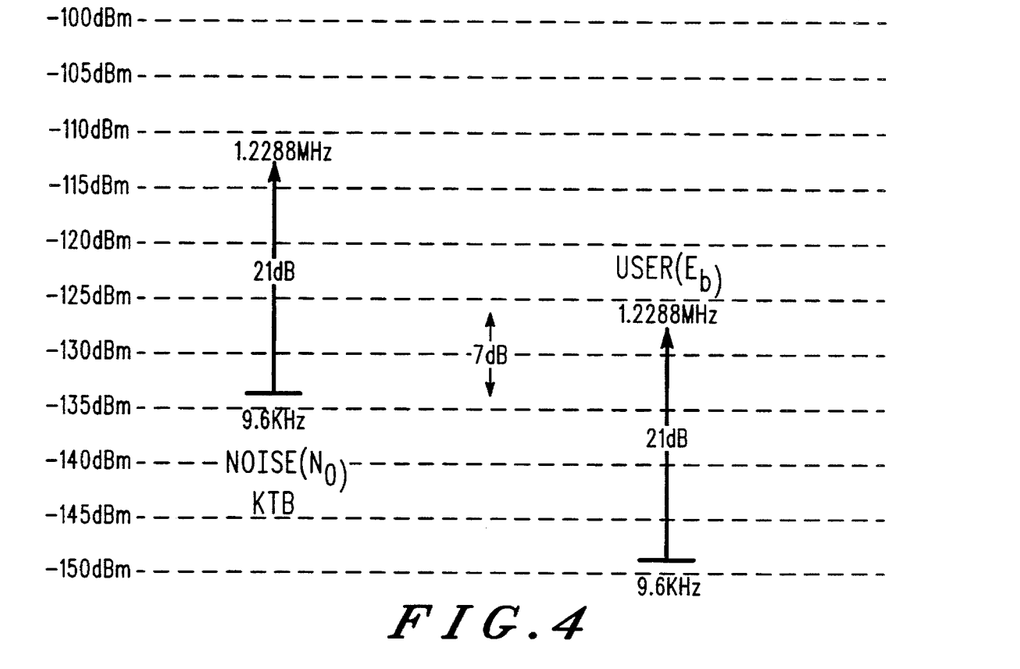
FIG. 4 is a graph illustrating the power level of the signals of FIG. 1.

The calculation of the −127 dBm figure for the single user signal of FIG. 1 is demonstrated with use of the graph of FIG. 4. Here, noise ($N_o$) for the 1.2288 MHz Bandwidth is shown as −113 dBm. When the noise signal is processed from a 1.2288 MHz bandwidth signal to a 9.6 KHz bandwidth, a 21 dB reduction is achieved as shown in equation 1.

$$10 \log_{10} (9.6/1.2288) = -21 \ dB \quad (1)$$

This places the noise signal at −134 dBm at a 9.6 KHz bandwidth. Therefore, to achieve an $E_b/N_o$ of 7 dB, a −127 dBm (−134+7) signal ($E_b$) must be provided at the 1.2288 MHz bandwidth. To achieve the −127 dBm after processing, a −148 dBm signal (−127−21) is needed before adding 21 dB of processing gain. This works out to the receive power of the user being 14 dB below KTB.

The purpose of the 7 dB $E_b/N_o$ level is to provide a desired audio quality in the signal. If the $E_b/N_o$ of a particular signal should drop below 7 dB, the cell site would look to hand-off the call. Failing a hand-off, the system may terminate the call.

In FIG. 2, a representation of a system having an additional 19 users is illustrated. With respect to user 1, the 19 new users provide additional noise. While KTB is a smaller proportion of the circle, as compared with FIG. 1, the overall area of KTB is the same. However, because of the added noise from the additional users, the area (power) of user 1 has increased. The dashed spiral line in FIG. 2 starts at the user power level for a single user system and moves outward as additional users are added; until reaching the current radius of the circle with 20 users.

In FIG. 3, the system has reached 25.5 users, the point where KTB has the same power as one user. Adding 24.5 users to KTB provides an equivalence of 25.5 users; each of which are contributing noise to the call of the remaining users. Again, the area of KTB has remained the same throughout the addition of users; while the power of user 1 has increased to compensate for the additional noise.

Figure 5:
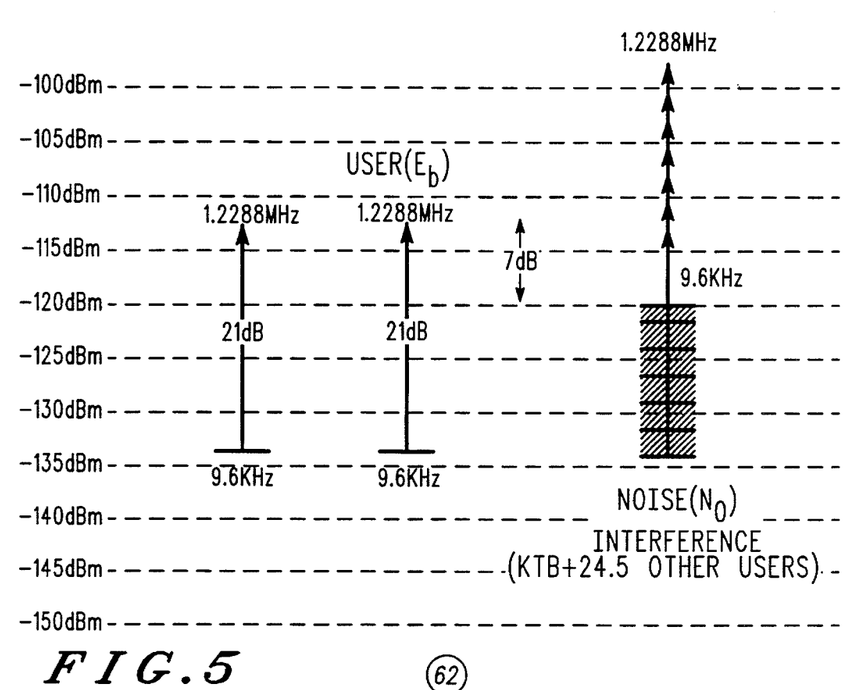
FIG. 5 is a graph illustrating the power level of the signals of FIG. 3.

In FIG. 5, a graph of the KTB, Noise, and User 1 power levels is shown. As illustrated, the power level of KTB has not changed. However, the total interference ($N_o$), including KTB, has increased from −113 dBm to −99 dBm at 1.2288 MHz. Reducing the power level by 21 dB when the interference is process to a 9.6 KHz signal (see equation (1) above), results in a power level of −120 dBm. To provide an $E_b/N_o$ of 7 dB, the user signal must be −113 dBm (−120+7) at 1.2288 MHz. Therefore, as the number of additional users increase, the signal level of the target user must increase from a level 14 dBm below KTB, to a level equal to KTB.

Figure 6:
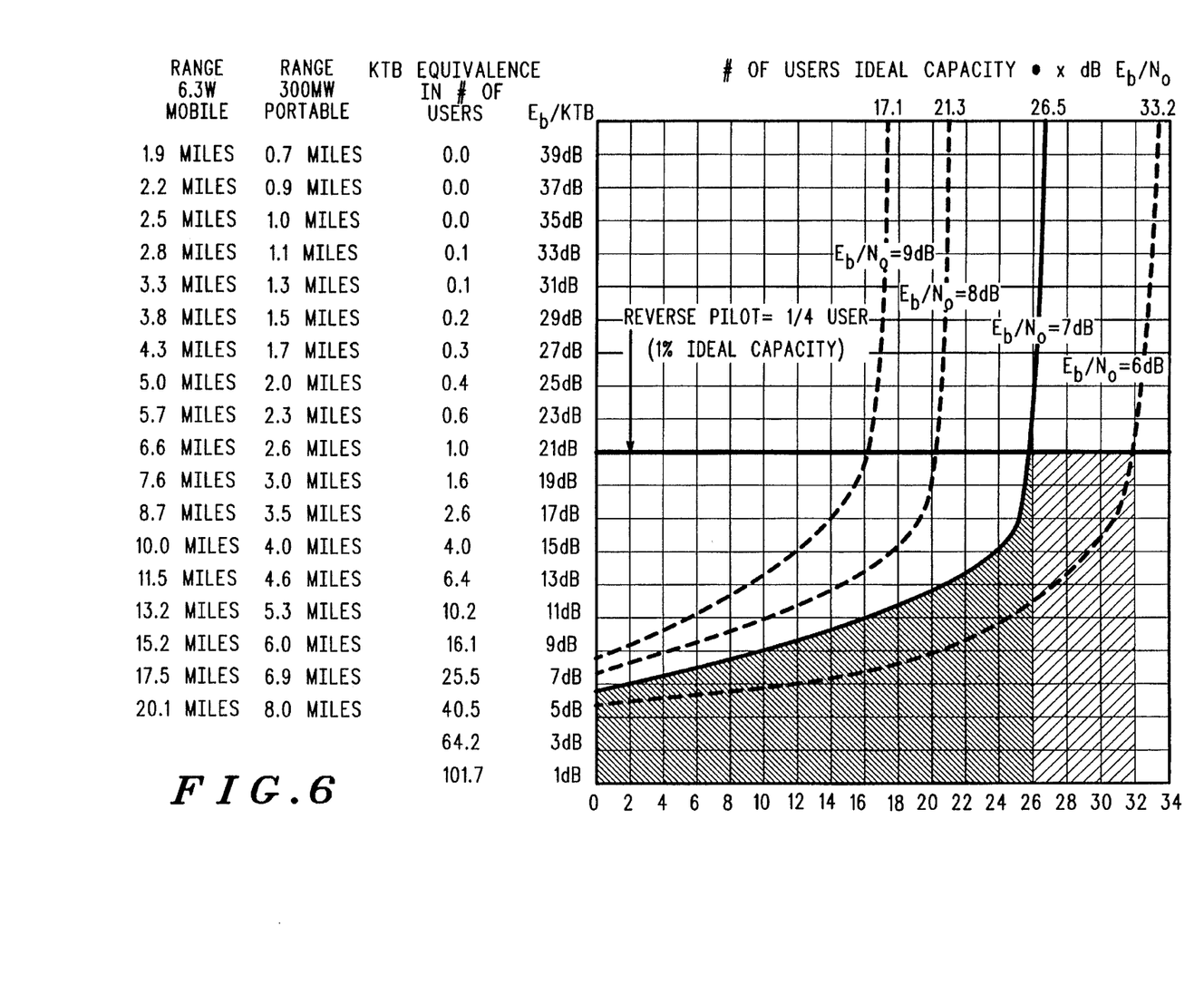
FIG. 6 is a chart of the signal-to-thermal noise ratio vs. the number of users for set signal-to-noise ratios.

In the present communication systems, the maximum number of users, here 26.5 (which would be rounded to 26 full rate users), are predetermined based upon a set $E_b/N_o$, here 7 dB. This means that a 27th user would be prevented from obtaining access to the system. If the 27th user was not prevented from entering the system, the power needed by each subscriber to overcome the interference would escalate to infinity. This is demonstrated in the graph of FIG. 6. In this graph, the abscissa is the number of users in the system and the ordinate is $E_b/KTB$. At a constant $E_b/N_o$ of 7 dB, the $E_b/KTB$ increases from around 33 dB for 26 users to infinity for 27 users. As shown by the column labeled "KTB Equivalence in Number of Users", the constant KTB power is fit into the equivalent of 0.1 users at 26 users. In relation to FIGS. 2 and 3, as the number of users increases, the constant KTB is forced into narrower slices of the pie tending toward zero. This in turn, since the KTB power is constant, increases the radius of the pie toward infinity.

As the subscribers hit their maximum power levels, shown as 6.3 watts for mobiles and 300 milliwatts for portables, the effective range of the cell shrinks, tending toward zero. This results in calls being dropped until the system can again be brought under control. The system would be brought under control by dropping the calls having an $E_b/N_o$ below 7 dB.

Figure 7:
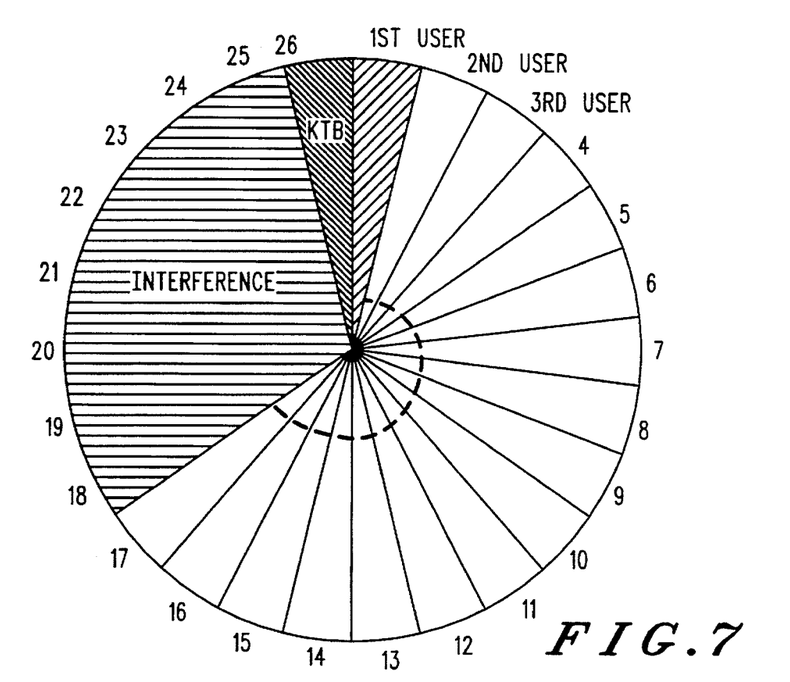
FIG. 7 is a graph illustrating the power level of another communication system.

This problem is compounded by the fact that the internal interference of one cell is the external interference of another cell. In the graph of FIG. 7, a system is shown having a primary user; 16 additional users; KTB; and 8.5 users worth of interference from outside the cell. If the interference were to increase, the power output of the 17 users would have to increase to keep the interference segment from forcing out one of the users. As the interference increases toward infinity, as in the example above, the power output by the resident users of this cell would also increase toward infinity. This demonstrates that one cell going out of control can have a ripple effect throughout the system.

In addition, FIG. 7 illustrates that having a preset maximum number of users for a system does not alleviate the power control problem. In FIG. 7, while only 17 resident users are on the system, it is at capacity because the interference occupies the additional 8.5 user slots. If an 18th user enters the system, which would be permitted since the number of resident users is not at its maximum, the power levels will escalate out of control as described above with FIG. 6. One possible solution would be to set the maximum number of users to 17, or some number less than full capacity. Since the interference will vary anywhere from 0 users to more than 8.5 users, the maximum capacity would have to be chosen based upon the worst case of interference anticipated. This would waste system capacity by restricting new users even when the interference is less than the worst case design.

A solution to this problem is to permit the $E_b/N_o$ level to float depending upon the circumstances. Returning to FIG. 6 and the above example, the addition of the 27th user when $E_b/N_o$ is set at 7 dB caused the power in the system to escalate out of control. In the present invention, the system is permitted to reduce the $E_b/N_o$ level. If the $E_b/N_o$ is reduced from 7 dB to 6 dB, the $E_b/KTB$ value drops from infinity to around 14 dB. This will also cause all of the subscribers in the system to reduce their power to match a 6 dB $E_b/N_o$ level. It should be noted here that the $E_b/N_o$ reduction does not need to be a full decibel but could be a fraction of a decibel. In addition, the system need not attempt to totally compensate for the additional user all in one step. The $E_b/N_o$ may be reduced in incremental steps until a level is reached where all of the calls may be accommodated.

However, it has been found that maintaining a set $E_b/N_o$ for the entire system will result in differing frame error rates (FER) between individual mobiles. As a result, an alternative to the above is to set a constant system FER, such as 1%, and have different $E_b/N_o$ rates set for each mobile. This alternative is discussed with in the description of FIG. 11 below.

A drawback to this process is that when the $E_b/N_o$ level is reduced, the quality of all of the calls in the system is reduced slightly. In order to keep the quality of the calls from being degraded too much, a minimum $E_b/N_o$ threshold level is established. Once the minimum $E_b/N_o$ is reached, subscribers that are unable to operate at that minimum level would be handed-off, if possible.

As calls are completed and the number of users begins to drop, the $E_b/N_o$ would increase incrementally to the original threshold value.

As the system continues to add users, the $E_b/N_o$ of the system will continue to be reduced until a minimum threshold level is reached. For example, if the minimum threshold were set to 6 dB, only 32 users would be permitted on the system. Any additional users would either be prevented from entering the system, or be handed off to another cell. Alternatively, the system could be constructed to look to hand-off and existing user to make room for a new user.

While this method permits the addition of users, the power control problems still remain. Once the $E_b/N_o$ hits its minimum, the next user could push the system over the edge. A solution to this problem is through the use of a pilot signal as described in copending patent application "A Method for Controlling Transmission Power in a Communication System" cited above.

However, the above described procedure effects the system in general and could be triggered by a single subscriber unit. Therefore, a method is needed to determine when an adjustment to the system performance is desirable. Such a process, generally designated 60, is illustrated in the flow chart of FIG. 8. Process 60 commences at step 61 by setting a threshold (TH) transmit power margin to a first level (10 dB), as illustrated below in Table 1. It should be noted here that other signal characteristics, such as quality, may be used in implementing the present invention.

TABLE 1

| Threshold Transmit Power Margin | |
| --- | --- |
| TH LEVEL | MARGIN (dB) |
| 1 | 10 |
| 2 | 12 |
| 3 | 14 |

Process 60 then proceeds to step 62 where the margin for each subscriber unit is measured. Optionally, the distance from the base site to the subscriber may also be measured. Also, as will be explained below in the description of FIG. 11, FER (Frame Error Rate) may also be used. It is then determined if there are any "Bad" subscribers, subprocess 63. Subprocess 63 is described in more detail below in in conjunction with FIG. 10. A Bad subscriber is one whose margin is below the threshold level. Whether a subscriber is Bad can also be based upon a combination of transmit margin with other factors such as distance or the number of Bad units.

When Bad subscribers exist, the action to be taken is dependent upon the state of the system. The system may be under capacity, at marginal capacity, or over capacity. An example of this is described below in conjunction with Table 2 and a cellular system, generally designated 75, FIG. 9.

TABLE 2

| Subscriber Transmit Power Margin (dB) at a 7 dB $E_b/N_o$ | | | | |
| --- | --- | --- | --- | --- |
| | DISTANCE | CAPACITY (dB) | | |
| Subscriber | (radius) | UNDER | MARGIN | OVER |
| S1 | 1.6 | 20 | 11 | 0 |
| S2 | 1.2 | 24 | 19 | 4 |
| S3 | 0.8 | 30 | 25 | 9 |
| S4 | 0.4 | 45 | 40 | 18 |

Figure 9:
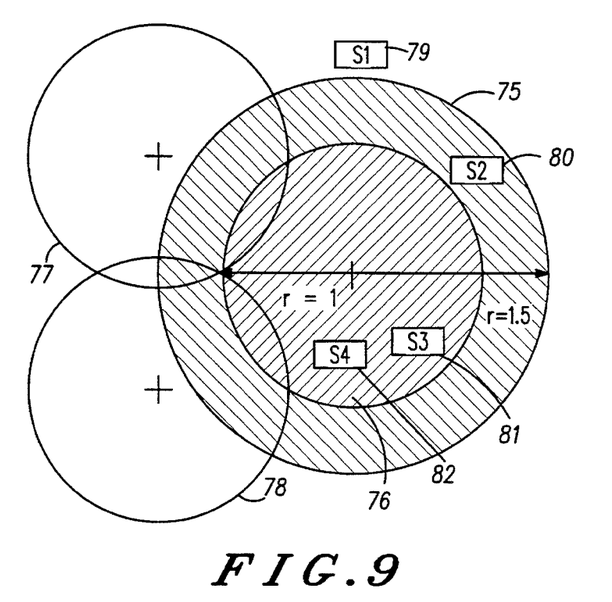
FIG. 9 is a system diagram of a communication system utilizing the present invention.

In FIG. 9, three cells are illustrated, cells 76, 77, and 78, with cell 76 being the one of interest. Cell 76 is currently serving four subscribers 79–82. Subscriber S1 (79) is illustrated as being at a distance of 1.6 times the normal cell radius. If the system were under capacity, the power margin would be 20 dB; at marginal capacity, 11 dB; and at over capacity, 0 dB. Therefore, with the Level 1 threshold set at 10 dB, subscriber 79 would be good if the system were either under capacity or marginal capacity. The same would be true for subscribers 2–4. If the current threshold level was 14 dB, Level 3, then subscriber S1 (79) would be considered bad at either marginal capacity or over capacity.

Figure 8:
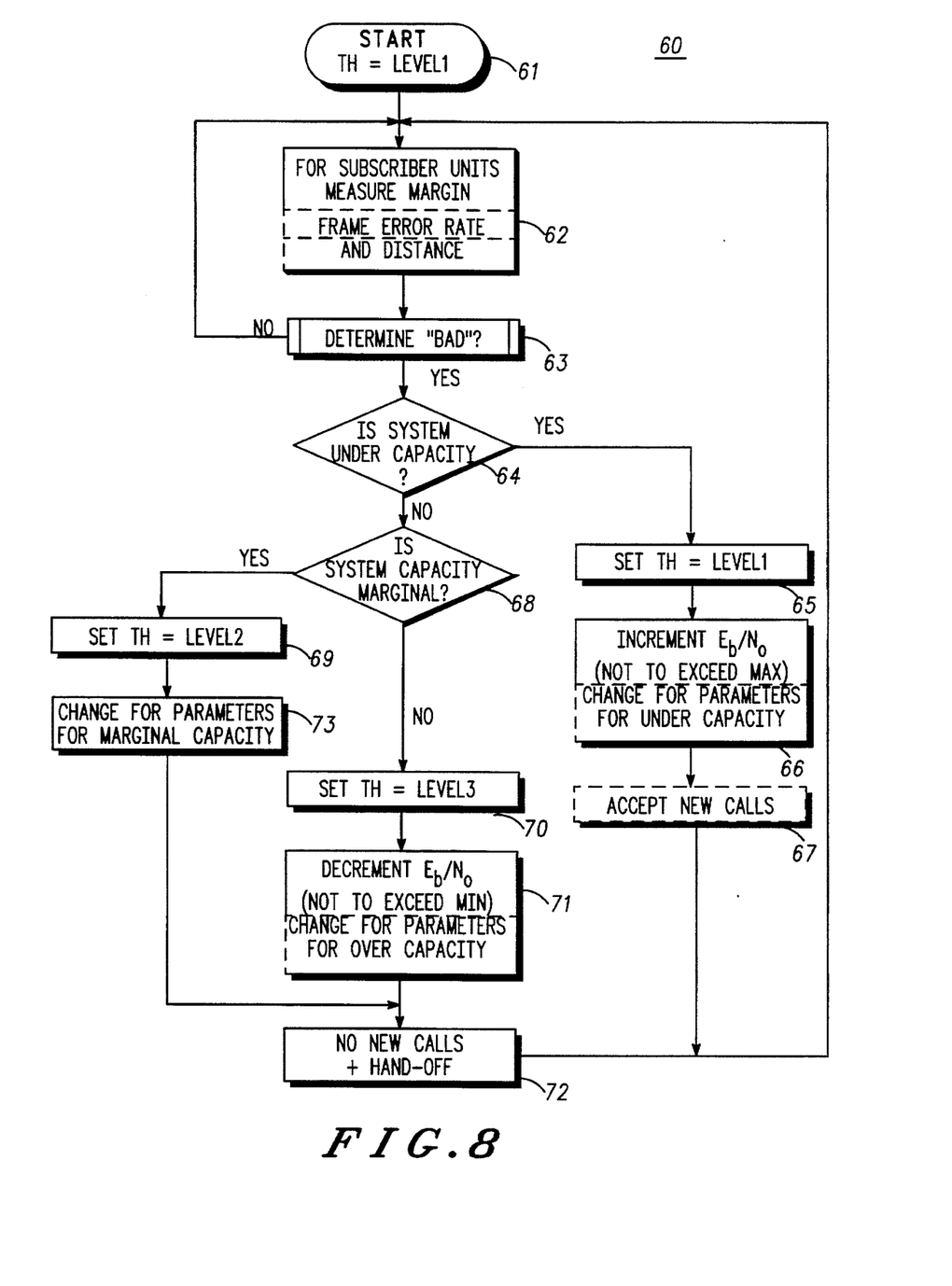
FIG. 8 is a block diagram of a process embodying the present invention.

Returning to process 60, once the subscribers have been reviewed to find Bad subscribers, subprocess 63, it is then determined if the system is under capacity, decision step 64. If the system is under capacity, the threshold level, Table 1, is set to Level 1, step 65. The subscriber power requirement will then be modified by incrementing the system $E_b/N_o$, not to exceed a maximum value, step 66. Optionally, if the system was prohibited from receiving new calls, this prohibition is lifted, step 67. Process 60 then loops back to step 62.

If, at decision step 64, it was determined that the system was not under capacity, process 60 would proceed to determine if the system is at marginal capacity, decision step 68. If the system is at marginal capacity, the threshold level, Table 1, is set to Level 2, step 69. At this point, the process may optionally prevent new calls from being accepted and attempt to hand-off any subscribers which do not meet the Level 2 threshold margins.

In this situation, the threshold margin is increased to prevent a form of ping-ponging. If the margin were left at level 1, a Bad subscriber would be handed-off. However, once handed-off, the system, due to the extra capacity, would be able to accept another call and the Bad subscriber would be returned to the first cell. The process would then repeat itself, ping-ponging. By increasing the threshold level, this can be prevented.

Returning to decision step 68, if the system is not at marginal capacity (i.e. is over capacity), the threshold margin is set to Level 3, step 70, and the $E_b/N_o$ value is decremented, not to exceed a minimum value, step 71. This reduction in system $E_b/N_o$ allows each of the subscribers to reduce their power, thereby increasing the power margin. This is illustrated in Table 3.

TABLE 3

| Power Margin (dB) at a 7 dB and 6.8 dB $E_b/N_o$ | | | |
| --- | --- | --- | --- |
| | | CAPACITY (dB) | |
| Subscriber | DISTANCE | OVER | CORRECTED |
| S1 | 1.6 | 0 | 12 |
| S2 | 1.2 | 4 | 16 |
| S3 | 0.8 | 9 | 21 |
| S4 | 0.4 | 18 | 30 |

Subscriber S1 (79) has gone from a margin of 0 at an $E_b/N_o$ of 7 dB to a margin of 12 at an $E_b/N_o$ of 6.8 dB. However, while the margins have been increased, the decrease in $E_b/N_o$ will result in a slight degradation in signal quality. To offset this degradation, the threshold margin is increased. Before the system adjustments, subscribers S1–S3 would have been considered Bad at the Level 1 threshold of 10 dB. After the $E_b/N_o$ adjustment all of the subscribers exceed the Level 1 value, but not the Level 3 threshold of 14 dB. Under this process, subscriber S1 would still be considered Bad.

At this point, the system may optionally stop accepting new calls and/or attempt to hand-off the Bad subscribers, step 72. Following step 72, the process returns to step 62.

In addition to the above, the distance information can be utilized to determine if the above procedure should be used to adjust the entire system or if some individual action should be taken with regard to a particular subscriber. For example, subscriber unit S1 (79) is at a distance of 1.6 times the normal cell radius. If the only Bad subscriber unit is determined to be subscriber S1 (79), it may be more beneficial to hand-off, ignore, or drop this call rather than adjust the entire system. Therefore, if a particular call was below the power margin threshold, but beyond a predetermined distance, the call could be removed from the Bad list.

In another particular embodiment, a table can be used to determine if the number of subscriber units which do not meet the threshold is large enough to warrant adjustment to the entire system. An example of this is shown in Table 4.

TABLE 4

Maximum Subscribers Below Threshold (TH) Margin Over Capacity

| MAX. SUBSCRIBERS (UNITS) | TH MARGIN (dB) |
|---|---|
| 1 | <1 |
| 10 | <5 |
| 20 | <10 |

Table 4 represents the number of subscribers which would have to fail the threshold level before any action would be take by the system. If there were 20 units with less than a 1 dB transmit power margin, then the system would adjust itself. The system would also be adjusted if there were ten units at less than 5 dB or one unit at less than 1 dB. An example of the functioning of this process is demonstrated using Table 5.

TABLE 5

SAMPLE MEASUREMENT

| SUBSCRIBERS (UNITS) | TH MARGIN RANGE (dB) |
|---|---|
| 0 | 0–1 |
| 5 | 2–5 |
| 16 | 6–10 |
| X | 11–Y |

The first row shows that there are no Bad units with less than 1 dB of power margin. Therefore, this would not trigger a system adjustment. The second row shows that there are five Bad units with 2–5 dB of margin. This gives a total of five Bad units below 5 dB and would also not trigger a system adjustment. The third row shows 16 Bad units with 6–10 dB of power margin. While these 16 Bad units alone would not trigger a system adjustment, when combined with the 5 Bad units from the previous row, there are a total of 21 Bad units with power margins less than 10 dB. This is enough, from Table 4, to trigger a system wide adjustment.

Taking this concept a step further, different tables, such as Table 4, can be established for the different capacity levels. Tables 6 and 7 below are examples of Maximum Subscriber Tables for Under and Marginal capacity.

TABLE 6

Maximum Subscribers Below Threshold (TH) Margin Under Capacity System

| MAX. SUBSCRIBERS (UNITS) | TH MARGIN (dB) |
|---|---|
| 1 | <6 |
| 2 | <10 |
| 3 | <13 |

TABLE 7

Maximum Subscribers Below Threshold (TH) Margin Marginal Capacity System

| MAX. SUBSCRIBERS (UNITS) | TH MARGIN (dB) |
|---|---|
| 1 | <3 |

TABLE 7-continued

Maximum Subscribers Below Threshold (TH) Margin Marginal Capacity System

| MAX. SUBSCRIBERS (UNITS) | TH MARGIN (dB) |
|---|---|
| 3 | <6 |
| 5 | <10 |

Comparing Table 6 with Table 4 shows that the number of Max. Subscribers has been reduced at each level and the margin has been raised. This provides the result that when a system is under capacity, the system is more likely to undertake a system wide adjustment than when it is over capacity. Likewise, the numbers for Marginal Capacity, Table 7, fall between those of over and under capacity.

Again, the idea of Bad units may be adjusted for the distance the unit is from the center of the cell, as described above.

Figure 10:
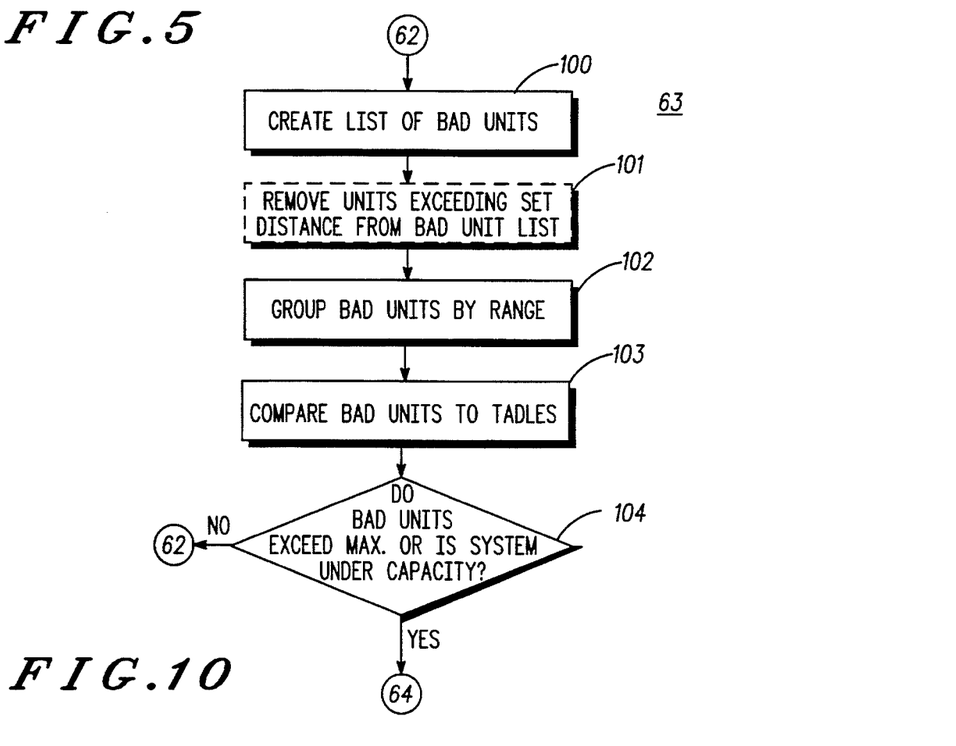
FIG. 10 is a block diagram of a subprocess of FIG. 8.

Referring to FIG. 10, a process flow diagram of subprocess 63, FIG. 8, is presented which illustrates the use of the comparison tables above. Subprocess 63 first creates a list of Bad units, step 100. If the distance information and procedure are to be used, then optional step 101 will remove any units from the Bad list which exceed some predetermined range. The subprocess then groups the Bad units in ranges, step 102. This is similar to the groupings shown in Table 5. In step 103, this grouping is then compared with an appropriate (e.g. Over Capacity) table, such as Table 4. If the number of bad units exceeds a maximum number or the system is under capacity, decision step 104, then the process will proceed to step 64 and implement a system adjustment. If the number of Bad units does not exceed a maximum number, the process loops back to step 62 and a system wide adjustment is not made.

Therefore, a means has been shown which helps eliminate power control run away in a communication system. As will be understood by those skilled in the art, the power measurements are just one signal characteristic which can be used to judge the quality of the communication. There are other signal characteristics which may be used in place of power measurements which can be utilized in the same manner set forth above.

Figure 11:
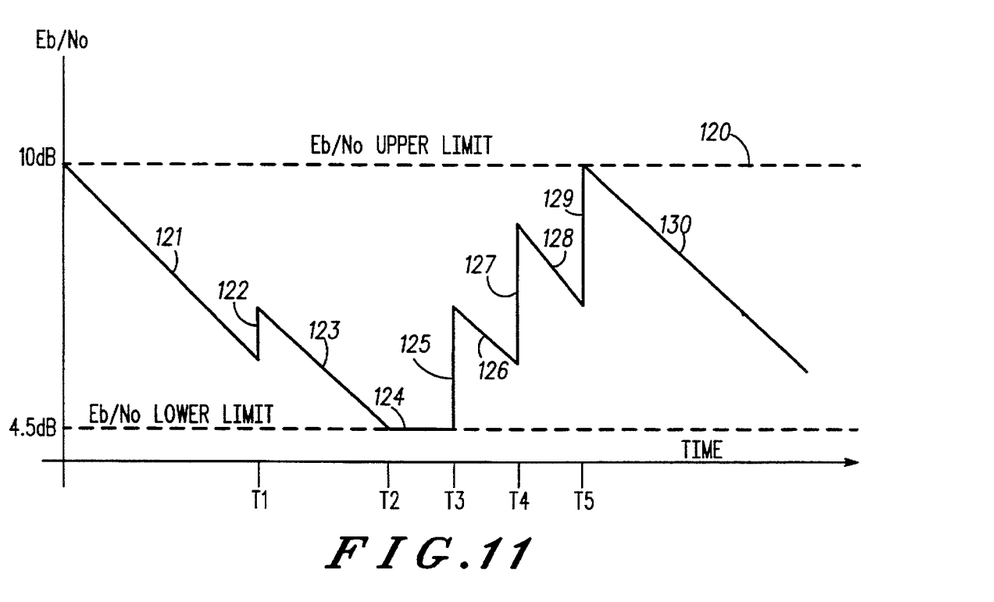
FIG. 11 is a graph of an alternative signal characteristic which may be utilized by the present invention.

An example of another signal characteristic which may be used for controlling the subscribers transmit power is illustrated in graph 120 of FIG. 11. This method utilizes the FER (Frame Error Rate) to establish the $E_b/N_o$ value desired for each subscriber in an under capacity system. In a preferred embodiment, the subscriber will first be set to a designated maximum $E_b/N_o$, 10 dB. The $E_b/N_o$ will then be gradually reduced over time, as represented by line 121, until a frame error occurs. In this example, a frame error has occurred at time $T_1$. This frame error results in the system raising the $E_b/N_o$ for the unit, as illustrated by line 122. After the $E_b/N_o$ has been raised due to the frame error, the $E_b/N_o$ will again be tapered. This time, the tapering of the $E_b/N_o$ value continues until a minimum $E_b/N_o$ is reached. This is illustrated by line 123 and the minimum $E_b/N_o$ of 4.5 dB is reached at $T_2$. Once reaching the minimum $E_b/N_o$, the subscriber will remain at this level, line 124, until another frame error is reached, at $T_3$. The process then repeats throughout the duration of a call.

In addition to the above, if frame errors occur within a preset time interval, as represented between $T_3$ and $T_4$ or $T_4$ and $T_5$, then the jump in $E_b/N_o$ (lines 127 or 129) is greater than if the frame errors are spaced at an interval more than the preset time interval.

The parameters for an FER regulated system are provided in Table 8 below.

TABLE 8

FER Parameters

| PARAMETER | CAPACITY | | |
|---|---|---|---|
| | UNDER | MARGINAL | OVER |
| $E_b/N_o$ UPPER LIMIT | 10 dB | 9 dB | 8 dB |
| $E_b/N_o$ LOWER LIMIT | 4.5 dB | 4 dB | 3.5 dB |
| $E_b/N_o$ SLEW RATE | 0.5 dB/sec | 1.0 dB/sec | 2.0 dB/sec |
| $E_b/N_o$ STEP UP | 2 dB | 1 dB | 0.5 dB |
| STEP AFTER | 1 FE | 2 FE | 3 FE |
| FER | 1% | 2% | 4% |

As illustrated, the various parameters for a system which is under capacity have been set to have an $E_b/N_o$ upper limit of 10 dB, a lower limit of 4.5 dB, and a slew rate of 0.5 dB/sec. In this case, a step up of 2 dB would occur after the occurrence of 1 frame error. This would maintain the 1% FER for the under capacity case. The slew rate is the rate at which the $E_b/N_o$ is permitted to adjust downward, see lines 121 and 123 of FIG. 11. The step up is illustrated by steps 122 or 125 of FIG. 11 and is the amount of increase in $E_b/N_o$ which will be executed at any one time.

However, as with the $E_b/N_o$ adjusting system, additional users may be added to the system causing the system to move from an under capacity case to a marginal capacity case. When this occurs, the parameters illustrated in FIG. 11 are adjusted to those shown in Table 8. In particular, the upper limit for the $E_b/N_o$ is changed from 10 dB to 9 dB. These changes, along with a change in the acceptable FER from 1% to 2% allows the additional users to operate in the system by slightly reducing the voice quality of all users. Tests have shown that, for a change from 1% to 2% in FER, a soft degradation in voice quality results. The term soft degradation is used because the resulting degradation is typically not enough for a normal system user to identify.

As in the case with $E_b/N_o$ adjustments, above, this system may also add enough users to be over capacity. In this case, the $E_b/N_o$ parameters are again adjusted to permit the additional users and reseting the FER to 4%, as shown in Table 8.

Returning to FIG. 8, some modifications are made to process 60 when using FER. At step 62, in addition to measuring margin, the FER for the subscriber units is also measured. At step 66, when the system is under capacity, the $E_b/N_o$ parameters are changed to those for the under capacity case. In step 71, when the system is over capacity, the $E_b/N_o$ parameters are changed to those for the over capacity case. In the case of marginal capacity, an additional step, step 73, is added in which the $E_b/N_o$ parameters are set to those for the marginal capacity case.

Thus, it will be apparent to one skilled in the art that there has been provided in accordance with the invention, a method for compensating for capacity overload in a spread spectrum communication system that fully satisfies the objects, aims, and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

I claim:

1. A method for controlling a threshold signal characteristic of a communication system having a base site, said method comprising the steps of:

determining a signal characteristic for each of a plurality of subscriber units in said communication system;

determining if said signal characteristic of any of said plurality of subscriber units is below said threshold signal characteristic;

determining a capacity of said communication system;

setting said threshold signal characteristic at said base site to a first threshold if said capacity of said communication system is an under capacity and incrementing a signal-to-noise threshold level if said signal characteristic of at least one of said plurality of subscriber units is below said threshold signal characteristic;

setting said threshold signal characteristic at said base site to a second threshold if said capacity of said communication system is a marginal capacity; and setting said threshold signal characteristic at said base site to a third threshold if said capacity of said communication system is not said under capacity or said marginal capacity.

2. The method of claim 1 further comprising the steps of:

determining a distance between a base site and each of said plurality of subscriber units; and using said distance and said signal characteristic to determine if a particular subscriber unit is outside said threshold signal characteristic.

3. The method of claim 1 wherein said step of incrementing said signal-to-noise threshold level increments said signal-to-noise threshold level if said signal-to-noise threshold level is below a maximum signal-to-noise threshold level.

4. The method of claim 1 further comprising the step of accepting a new call if said system has been closed to receiving said new call.

5. The method of claim 1 further including the step of decrementing a signal-to-noise threshold level if said threshold signal characteristic is said third threshold.

6. The method of claim 5 wherein said step of decrementing said signal-to-noise threshold level decrements said signal-to-noise threshold level if said signal-to-noise threshold level is above a minimum signal-to-noise threshold level.

7. The method of claim 1 further comprising the step of closing said communication system from receiving a new call if said threshold signal characteristic is set to one of said second and third thresholds.

8. The method of claim 1 wherein said step of determining if said signal characteristic of any of said plurality of subscriber units does not satisfy said threshold signal characteristic comprises the steps of:

creating a list of said plurality of subscriber units whose signal characteristic does not satisfy said threshold signal characteristic;

assigning each of said plurality of subscriber units on said list to one of a plurality of signal characteristic ranges; and comparing a number of subscriber units in each of said plurality of signal characteristic ranges with a limit on each of said plurality of signal characteristic ranges until either a maximum number within one of said signal characteristic ranges is exceeded or all of said plurality of signal characteristics ranges are compared.

9. The method of claim 8 further comprising the step of removing a subscriber unit from said list if a distance determined for said subscriber unit exceeds a predetermined distance.

10. The method of claim 1 wherein said signal characteristic is a power transmit margin.

11. The method of claim 10 wherein said threshold transmit power margin is a threshold transmit power margin table.

12. The method of claim 1 wherein said signal characteristic is a frame error rate.

13. The method of claim 12 further comprising the step of incrementing an energy-to-noise ratio if said threshold frame error rate is exceeded.

14. A method for controlling a threshold signal characteristic of a communication system having a base site, said method comprising the steps of:

- determining a transmit power margin for each of a plurality of subscriber units in said communication system;
- creating a list of said plurality of subscriber units whose transmit power margin fails to meet said threshold transmit power margin;
- assigning each of said plurality of subscribers on said list to one of a plurality of transmit power ranges;
- comparing a number of subscriber units in each of said plurality of transmit power ranges with a limit on each of said plurality of transmit power ranges until either a maximum number within one of said transmit power ranges is exceeded or all of said plurality of transmit power ranges are compared;
- determining a capacity of said communication system;
- setting said threshold transmit power margin to a first threshold if said capacity of said communication system is an under capacity and said maximum number within one of said transmit power ranges is exceeded;
- setting said threshold transmit power margin to a second threshold if said capacity of said communication system is a marginal capacity and said maximum number within one of said transmit power ranges is exceeded; and
- setting said threshold transmit power margin to a third threshold if said capacity of said communication system is not said under capacity or said marginal capacity and said maximum number within one of said transmit power ranges is exceeded.

15. The method of claim 14 further comprising the steps of:

- determining a distance between a base site and each of said plurality of subscriber units; and
- using said distance and said transmit power margin to determine if a particular subscriber remains on said list.

16. The method of claim 14 further comprising the step of incrementing said signal-to-noise level if said threshold transmit power margin is said first threshold.

17. The method of claim 16 wherein said step of incrementing said signal-to-noise level increments said signal-to-noise level if said signal-to-noise level is below a maximum signal-to-noise level.

18. The method of claim 16 further comprising the step of accepting a new call if said system has been closed to receiving said new call.

19. The method of claim 14 further including the step of decrementing said signal-to-noise level if said transmit power margin is said third threshold.

20. The method of claim 19 wherein said step of decrementing said signal-to-noise level decrements said signal-to-noise level if said signal-to-noise level is above a minimum signal-to-noise level.

21. The method of claim 14 further comprising the step of closing said communication system from accepting a new call if said threshold transmit power margin is set to one of said second and third thresholds.

22. A method for controlling transmission power in a communication system having a base site by setting a, threshold transmit power margin and a signal-to-noise level, said method comprising the steps of:

- determining a transmit power margin for each of a plurality of subscriber units in said communication system;
- determining if said transmit power margin of any of said plurality of subscriber units fails to meet said threshold transmit power margin;
- determining a capacity of said communication system;
- setting said threshold transmit power margin at said base site to a first threshold and incrementing said signal-to-noise level if said capacity of said communication system is an under capacity and said transmit power margin of at least one of said plurality of subscriber units fails to meet said threshold transmit power margin;
- setting said threshold transmit power margin at said base site to a second threshold if said capacity of said communication system is a marginal capacity;
- setting said threshold transmit power margin at said base site to a third threshold if said capacity of said communication system is not said under capacity or said marginal capacity; and
- decrementing said signal-to-noise level if said threshold transmit power margin is said third threshold.

23. The method of claim 22 further comprising the steps of:

- determining a distance between a base site and each of said plurality of subscriber units; and
- using said distance and said transmit power margin to determine if a particular subscriber is outside said threshold transmit power margin.

24. The method of claim 22 wherein said step of incrementing said signal-to-noise level increments said signal-to-noise level if said signal-to-noise level is below a maximum signal-to-noise level.

25. The method of claim 22 further comprising the step of accepting a new call if said system has been closed from receiving said new call and said threshold transmit power margin is set to said first threshold power margin.

26. The method of claim 22 wherein the step of decrementing said signal-to-noise level decrements said signal-to-noise level if said signal-to-noise level is above a minimum signal-to-noise level.

27. The method of claim 22 further comprising the step of closing said communication system from accepting a new call if said threshold transmit power margin is set to one of said second and third thresholds.

28. The method of claim 22 wherein said step of determining if said transmit power margin of any of said plurality of subscriber units fails to meet said threshold transmit power margin comprises the steps of:

- creating a list of said plurality of subscriber units whose transmit power margin fails to meet said threshold transmit power margin;
- assigning each of said plurality of subscriber units on said list to one of a plurality of transmit power ranges; and
- comparing a number of subscriber units in each of said plurality of transmit power ranges with a limit on each of said plurality of transmit power ranges until either said limit of one of said transmit power ranges is exceeded or all of said plurality of transmit power ranges are compared.

29. The method of claim 28 further comprising the step of removing a subscriber unit from said list if a distance determined for said subscriber unit exceeds a maximum distance.

30. A method for controlling transmission power in a communication system having a base site by setting a threshold signal characteristic and a signal-to-noise parameter, said method comprising the steps of:

determining a signal characteristic for each of a plurality of subscriber units in said communication system;

determining if said signal characteristic of any of said plurality of subscriber units is below said threshold signal characteristic;

determining a capacity of said communication system;

setting said threshold signal characteristic at said base site to a first threshold if said capacity of said communication system is an under capacity and adjusting said signal-to-noise parameter if at least one of said plurality of subscriber units is below said threshold signal characteristic;

setting said threshold signal characteristic at said base site to a second threshold if said capacity of said communication system is a marginal capacity; and setting said threshold signal characteristic at said base site to a third threshold if said capacity of said communication system is not said under capacity or said marginal capacity.

31. The method of claim 30 wherein said threshold signal characteristics comprises one of a threshold power margin of a subscriber, a threshold distance of said subscriber unit to a base site, and a threshold frame error rate.

32. The method of claim 30 wherein said step of adjusting said signal-to-noise parameter performs one of the following steps:

increasing a signal-to-noise upper limit if said signal-to-noise upper limit is below a maximum upper limit;

increasing a signal-to-noise lower limit if said signal-to-noise lower limit is below a maximum lower limit;

reducing a slew rate of said signal-to-noise if said slew rate is above a first threshold; and increasing a step parameter if said step parameter is below a first threshold.

33. The method of claim 30 further comprising the step of accepting a new call if said system has been closed to receiving said new call.

34. The method of claim 30 further including the step of adjusting said signal-to-noise parameter if said threshold signal characteristic is said third threshold.

35. The method of claim 34 wherein said step of adjusting said signal-to-noise parameter performs one of the following steps:

reducing a signal-to-noise upper limit if said signal-to-noise upper limit is above a minimum upper limit;

reducing a signal-to-noise lower limit if said signal-to-noise lower limit is above a minimum lower limit;

increasing a slew rate of said signal-to-noise if said slew rate is below a third threshold; and decreasing a step parameter if said step parameter is above a third threshold.

36. The method of claim 30 further comprising the step of closing said communication system from receiving a new call if said threshold signal characteristic is set to one of said second and third thresholds.

37. The method of claim 30 wherein said step of determining if said signal characteristic of any of said plurality of subscriber units does not satisfy said threshold signal characteristic comprises the steps of:

creating a list of said plurality of subscriber units whose signal characteristic does not satisfy said threshold signal characteristic;

assigning each of said plurality of subscriber units on said list to one of a plurality of signal characteristic ranges; and comparing a number of subscriber units in each of said plurality of signal characteristic ranges with a limit on each of said plurality of signal characteristic ranges until either a maximum number within one of said signal characteristic ranges is exceeded or all of said plurality of signal characteristics ranges are compared.

38. The method of claim 37 further comprising the step of removing a subscriber unit from said list if a distance determined for said subscriber unit exceeds a predetermined distance.

39. A method for controlling transmission power in a communication system, said method comprising the steps of:

determining a capacity of said communication system;

establishing a threshold frame error rate based upon said capacity of said communication system;

establishing a threshold signal-to-noise ratio for a transmission from a subscriber unit in said communication system;

adjusting a transmission power level of said subscriber unit until said threshold signal-to-noise ratio is reached;

determining a frame error rate of said transmission from said subscriber unit;

decreasing said threshold signal-to-noise ratio if said frame error rate of said transmission is less than said threshold frame error rate; and increasing said threshold signal-to-noise ratio if said frame error rate of said transmission is more than said threshold frame error rate.

40. A method for controlling a threshold signal characteristic of a communication system having a base site, said method comprising the steps of:

determining a signal characteristic for each of a plurality of subscriber units serviced by said base site;

determining if said signal characteristic of any of said plurality of subscriber units is below said threshold signal characteristic;

determining a capacity of said base site;

setting said threshold signal characteristic at said base site to a first threshold if said capacity of said base site is an under capacity and incrementing a signal-to-noise threshold level if said signal characteristic of at least one of said plurality of subscriber units is below said threshold signal characteristic;

setting said threshold signal characteristic at said base site to a second threshold if said capacity of said base site is a marginal capacity; and setting said threshold signal characteristic at said base site to a third threshold if said capacity of said base site is not said under capacity or said marginal capacity.

41. A method for controlling a threshold signal characteristic of a communication system having a base site, said method comprising the steps of:

determining a transmit power margin for each of a plurality of subscriber units within a coverage area of said base site;

creating a list of said plurality of subscriber units whose transmit power margin fails to meet said threshold transmit power margin;

assigning each of said plurality of subscribers on said list to one of a plurality of transmit power ranges;

comparing a number of subscriber units in each of said plurality of transmit power ranges with a limit on each of said plurality of transmit power ranges until either a maximum number within one of said transmit power ranges is exceeded or all of said plurality of transmit power ranges are compared;

determining a capacity of said base site;

setting said threshold transmit power margin to a first threshold if said capacity of said base site is an under capacity and said maximum number within one of said transmit power ranges is exceeded;

setting said threshold transmit power margin to a second threshold if said capacity of said base site is a marginal capacity and said maximum number within one of said transmit power ranges is exceeded; and     setting said threshold transmit power margin to a third threshold if said capacity of said base site is not said under capacity or said marginal capacity and said maximum number within one of said transmit power ranges is exceeded.

42. A method for controlling transmission power in a communication system having a base site, said method comprising the steps of:

determining a capacity of said base site;

establishing a threshold frame error rate based upon said capacity of said base site;

establishing a threshold signal-to-noise ratio for a transmission from a subscriber unit in said base site;

adjusting a transmission power level of said subscriber unit until said threshold signal-to-noise ratio is reached;

determining a frame error rate of said transmission from said subscriber unit;

decreasing said threshold signal-to-noise ratio if said frame error rate of said transmission is less than said threshold frame error rate; and     increasing said threshold signal-to-noise ratio if said frame error rate of said transmission is more than said threshold frame error rate.

\* \* \* \* \*

UNITED STATES PATENT AND TRADEMARK OFFICE
CERTIFICATE OF CORRECTION

PATENT NO. : 5,475,861
DATED : 12/12/95
INVENTOR(S) : Hall, Scott M.

It is certified that error appears in the above-indentified patent and that said Letters Patent is hereby corrected as shown below:

Column 10, line 38 reads "decrementing a signal" should be
    —decrementing said signal—.
Column 12, line 7 reads "by setting a, threshold" should be
    —by setting a threshold—.

Signed and Sealed this

Twenty-third Day of April, 1996

Attest:

BRUCE LEHMAN

*Attesting Officer*  *Commissioner of Patents and Trademarks*